Figure 1:
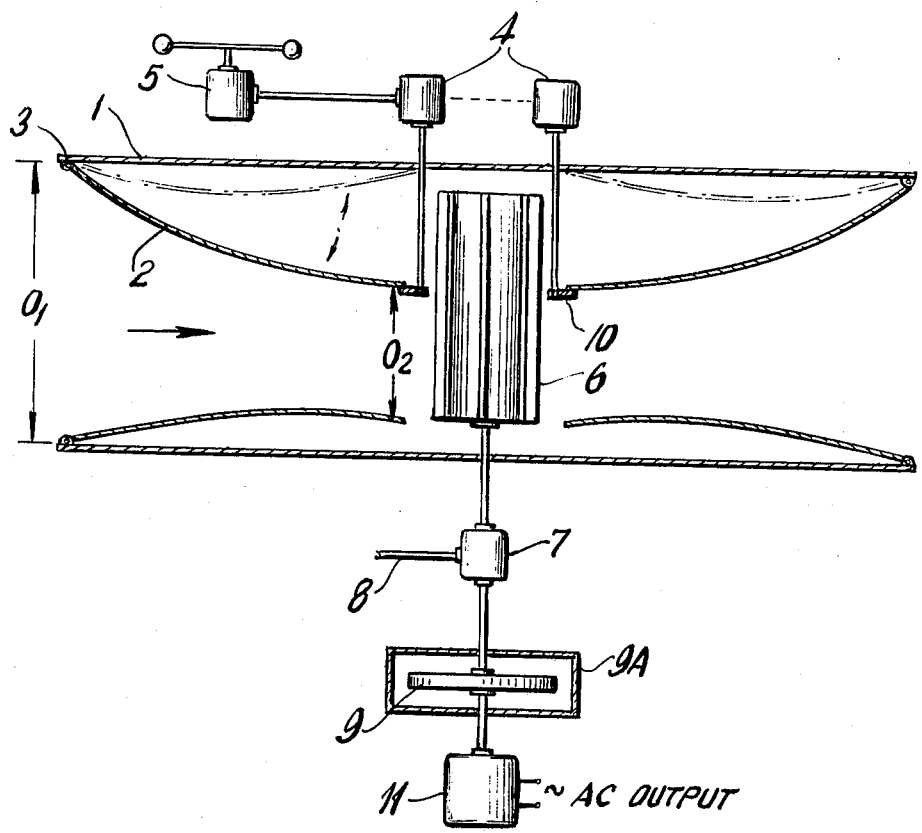

United States Patent [19]
Troll

[11] 3,944,840
[45] Mar. 16, 1976

[54] WIND POWER CONVERSION SYSTEM

[76] Inventor: John H. Troll, Cedar Road East, Katonah, N.Y. 10536

[22] Filed: Aug. 7, 1974

[21] Appl. No.: 495,268

[52] U.S. Cl. ............................................. 290/55
[51] Int. Cl.² ......................................... F03D 9/00
[58] Field of Search .................. 290/44, 43, 54, 55

[56] References Cited
UNITED STATES PATENTS

| | | | |
|---|---|---|---|
| 554,138 | 2/1896 | Negbaur | 290/55 |
| 1,345,022 | 6/1920 | Oliver | 290/55 X |
| 1,415,645 | 5/1922 | Holterud | 290/55 |
| 1,941,611 | 1/1934 | Mawikowske | 290/55 |
| 2,701,526 | 2/1955 | Rotkin | 290/55 |

*Primary Examiner*—Herman J. Hohauser
*Attorney, Agent, or Firm*—Hopgood, Calimafde, Kalil, Blaustein & Lieberman

[57] ABSTRACT

A wind-to-electric power conversion system is disclosed having ratio-variable entrance and exit openings. The ratio is set by sensing the velocity of the incoming wind, thereby effecting the velocity of the blade set driving an A.C. generator through a flywheel and thereby stabilizing the generator speed.

2 Claims, 2 Drawing Figures

WIND POWER CONVERSION SYSTEM

BACKGROUND OF THE INVENTION

This invention relates to wind energy conversion systems in general and, in particular, to a system which is sensitive to wind velocity for varying system configurations to provide a uniform output.

Windmills and other wind power conversion devices obtain power by converting, via blades, a column of moving air into an angular, mechanical motion.

An expression of the conversion factor is: the power contained in a cylinder of air of radius R, velocity V and $\delta$ density is given by $$P = 2\pi R^2 \delta V^3 \quad (1)$$

Neglecting rotational and drag losses, the work obtained per unit time $P_w$ is $$P_w = 2\pi R^2 \delta V^3 a(1-a)2 \quad (2)$$

Where R is the disc radius, $a$ is the interference factor, and $V$ and $\delta$ are as aforementioned.

The interference factor $a$ is used to express the diminution of the velocity that occurs at the disk, where it is $V(1-a)$. Behind the windmill the diminution factor increases to an ultimate value of $2a$. By obtaining the first derivative of $P_w$ with respect to $a$ and solving it for zero, it can readily be seen from (2) that $P_w$ is maximum when $a = \Delta$. At this point $P_w$ for any values of R, $\delta$ or V is 59.2 percent of P, the power originally in the air, which represents the maximum conversion efficiency that can be obtained.

The axial thrust, representing the force tending to overturn a stationary windmill is given by $$T = 2\pi R^2 \delta V^2 a(1-a) \quad (3)$$

This is maximum at $a = \frac{1}{2}$ and grows smaller with smaller values of $a$. Since the thrust is equivalent to the "drag" on an airplane, windmill designers try to minimize it by choosing smaller values of $a$ and large radii. The result is a smaller percentage of power which can be taken from the air.

The percentage of power removed from the air is proportional to the power coefficient $$P_c = P/(\delta R^2 V^3) \quad (4)$$

It is a function of $a$, or of the geometric arrangement of the windmill and of the tip speed ratio $2\pi R/V$ where $n$ is the revolutions per second. $P_c$ has been determined empirically in windtunnel tests for various blade configurations.

Thus, for example, the American multiblade type used for pumping water on American farms utilizes about 30 percent of the kinetic energy of the wind, the Dutch four-arm type about 16 percent and the high speed propeller type (Stuart propeller) about 42%. The last type rotates at a tip speed 6 to 8 times the wind speed and is used widely in connection with electrical power generation. For two-blade propeller windmills having a diameter of D feet geared to electric generators of 70 percent efficiency the maximum kilowatt output in winds of velocity V fps is expressed approximately by the formula $$kw = 0.376 \times 10^{-6} D^2 V^3 \quad (5)$$

It has been shown that only 59.2 percent of the kinetic energy of the wind is theoretically recoverable; based on this consideration, a windmill of 70 percent aerodynamic efficiency and 90 percent gearing efficiency can be expected to have an overall conversion efficiency of 37 percent of the wind kinetic energy. In the existing art, the wind velocity, which enters into the power equation as cubed value and is considered to be beyond the designer's control is considered the governing factor in the usage and application of windpower. It is customary to consider wind velocities in terms of well defined groups and classify them as prevalent (frequent) winds and energy winds.

Prevalent winds blow five out of 7 days, while energy winds blow two out of 7 days. The mean prevalent velocity is 2 mph less than the average monthly velocity; the energy winds blow at velocities of about 2.3 times those of the prevalent winds and produce with the current state of the art three-fourths of the total energy in a given month. The wind of the highest energy has about 10 mph higher velocity than the most frequent wind. For each month the energy of all the varying winds adds up to double the amount that would be computed from the average hourly velocity of that month.

For the present state of the art, 8 mph yearly average is the minimum wind velocity practical for propeller type wheels. For the very light multiblades in present use which are mounted for bypass for winds above 15 mph, an operating range from 6 to 15 mph affords a monthly power output 14% greater than if the range were 8 to 15 mph.

The high wind regions of the United States, having 10 mph or more average yearly wind velocity are: a north-and-south strip 350 miles wide midway between the Atlantic and Pacific Oceans; the littoral of the Great Lakes; the Atlantic Seaboard; the Gulf Coast; and the Pacific Ocean near San Francisco and at the State of Washington. (See Tables 1 and 2).

Table 1

| Station | Wind Velocities in the United States | | | Station | | | |
|---|---|---|---|---|---|---|---|
| | Avg velocity, mph | Prevailing direction | Fastest mile | | Avg velocity, mph | Prevailing direction | Fastest mile |
| Albany, N.Y. | 9.0 | S | 71 | Louisville, Ky. | 8.7 | S | 68 |
| Albuquerque, N.M. | 8.8 | SE | 90 | Memphis, Tenn. | 9.9 | S | 57 |
| Atlanta, Ga. | 9.8 | NW | 70 | Miami, Fla. | 12.6 | — | 132 |
| Boise, Idaho | 9.6 | SE | 61 | Minneapolis, Minn. | 11.2 | SE | 92 |
| Boston, Mass. | 11.8 | SW | 87 | Mt. Washington, N.H. | 36.9 | W | 150 |
| Bismarck, N.Dak. | 10.8 | NW | 72 | New Orleans, La. | 7.7 | — | 98 |
| Buffalo, N.Y. | 14.6 | SW | 91 | New York, N.Y. | 14.6 | NW | 113 |
| Burlington, Vt. | 10.1 | S | 72 | Oklahoma City, Okla. | 14.6 | SSE | 87 |
| Chattanooga, Tenn. | 6.7 | — | 82 | Omaha, Neb. | 9.5 | SSE | 109 |
| Cheyenne, Wyo. | 11.5 | W | 75 | Pensacola, Fla. | 10.1 | NE | 114 |
| Chicago, Ill. | 10.7 | SSW | 87 | Philadelphia, Pa. | 10.1 | NW | 83 |

Table 1-continued

Wind Velocities in the United States

| Station | Avg velocity, mph | Prevailing direction | Fastest mile | Station | Avg velocity, mph | Prevailing direction | Fastest mile |
|---|---|---|---|---|---|---|---|
| Cincinnati, Ohio | 7.5 | SW | 49 | Pittsburgh, Pa. | 10.4 | WSW | 73 |
| Cleveland, Ohio | 12.7 | S | 78 | Portland, Maine | 8.4 | N | 76 |
| Denver, Colo. | 7.5 | S | 65 | Portland, Ore. | 6.8 | NW | 57 |
| Des Moines, Iowa | 10.1 | NW | 76 | Rochester, N.Y. | 9.1 | SW | 73 |
| Detroit, Mich. | 10.6 | NW | 95 | St. Louis, Mo. | 11.0 | S | 91 |
| Duluth, Minn. | 12.4 | NW | 75 | Salt Lake City, Utah | 8.8 | SE | 71 |
| El Paso, Tex. | 9.3 | N | 70 | San Diego, Calif. | 6.4 | WNW | 53 |
| Galveston, Tex. | 10.8 | — | 91 | San Francisco, Calif. | 10.5 | WNW | 62 |
| Helena, Mont. | 7.9 | W | 73 | Savannah, Ga. | 9.0 | NNE | 90 |
| Kansas City, Mo. | 10.0 | SSW | 72 | Spokane, Wash. | 6.7 | SSW | 64 |
| Knoxville, Tenn. | 6.7 | NE | 71 | Washington, D.C. | 7.1 | NW | 62 |

U.S. Weather Bureau records of the average wind velocity, and fastest mile, at selected stations. The period of record ranges from 6 to 84 years, ending 1954. No correction for height of station above ground.

Table 2

WINDMILLS
Beaufort Scale of Wind Force
(Compiled by U.S. Weather Bureau, 1955)

| Miles per hour | Knots | Wind effects observed on land | Terms used in USWB forecasts |
|---|---|---|---|
| Less than 1 | Less than 1 | Calm; smoke rises vertically | Light |
| 1–3 | 1–3 | Direction of wind shown by smoke drift; but not by wind vanes | Light |
| 4–7 | 4–6 | Wind felt on face; leaves rustle; ordinary vane moved by wind | Light |
| 8–12 | 7–10 | Leaves and small twigs in constant motion; wind extends light flag | Gentle |
| 13–18 | 11–16 | Raises dust, loose paper; small branches are moved | Moderate |
| 19–24 | 12–21 | Small trees in leaf begin to sway; crested wavelets form on inland waters | Fresh |
| 25–31 | 22–27 | Large branches in motion; whistling heard in telegraph wires; umbrellas used with difficulty | Strong |
| 32–38 | 28–33 | Whole trees in motion; inconvenience felt walking against wind | Strong |
| 39–46 | 34–40 | Breaks twigs off trees; generally impedes progress | Gale |
| 47–54 | 41–47 | Slight structural damage occurs; (chimney pots, slates removed) | Gale |
| 55–63 | 48–55 | Seldom experienced inland; trees uprooted; considerable structural damage occurs | Whole gale |
| 64–72 | 56–63 | Very rarely experienced; accompanied by widespread damage | Whole gale |
| 73 or more | 64 or more | Very rarely experienced; accompanied by widespread damage | Hurricane |

OBJECTS OF THE INVENTION

It is an object of this invention to provide a wind power conversion system capable of operating within a range embraced by substantially all those wind velocities found in the United States.

It is another object of this invention to provide such a system with a substantially uniform power output under prevalent and energy wind conditions.

It is a further object of this invention to provide a conversion system in which side direction shifts do not require reorientation of the system.

It is a still further object of this invention to interface the wind conversion system with a flywheel storage system, thereby eliminating complicated electrical or mechanical storeage systems.

It is a further object of the invention to provide a conversion system capable of large outputs with low capital costs per killowatt and ecologically sound nonetheless.

These and other features and advantages of the invention will become apparent to anyone skilled in the art in the following description of the embodiment of the invention made in connection with the appended drawings in which FIG. 1 schematically represents the wind power conversion system of the invention.

Figure 2:
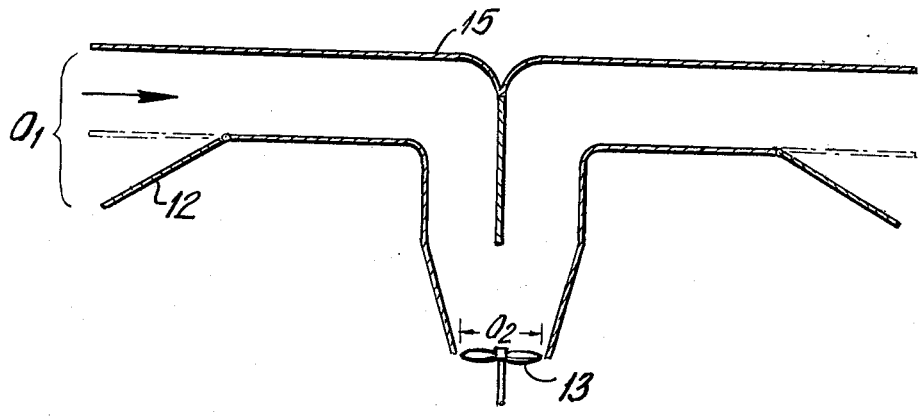

FIG. 2 illustrates schematically an alternate embodiment of the invention.

BRIEF DESCRIPTION OF THE INVENTION:

Turning now to FIG. 1, this figure may be visualized as a cross-section taken along the diameter of an essentially cylindrical structure. The system includes a frame 1, including a pair of circular discs separated by a distance $0_1$, arranged in such a way that wind currents pass between the discs regardless of direction. In FIG. 1, wind is symbolized by an arrow and is chosen to be blowing from left to right. A moveable vane 2 is pivoted at point 3 and is mechanically coupled so as to assume and hold any position between that shown by the vane position and the upper disk. Distance $0_2$ may be either equal to $0_1$ or smaller. Vane 2 embraces 360° of the circular structure. Where this vane is made from completely flexible material, the $0_2$ separation may be caused by a mechanical coupling between a rigid collar 10 at the innermost vane position and the frame. Alternatively, the vane structure may be divided into as many sections as is mechanically expedient.

The positioning of vane 2 is controlled by a servomotor 4 which, in turn, is controlled by a wind speed sensor 5 which generates a signal corresponding to wind velocity. Wind speed sensor may be either physically located on top of the structure or several units may be remotely located to provide anticipation to the system.

The wind exiting at $0_2$ impells the cylindrical windwheel 6 to rotate at a velocity which is determined by the initial wind velocity $V_o$ amplified by a factor equivalent to the ratio between the areas of $0_1/0_2$. If, for example, the ratio between the opening was made to be 10; a 6 mile per hour wind would appear at the windwheel to be 60 miles per hour. By continuous adjustment of the vane 2, the windwheel can be kept spinning at a designed rate over a wide spectrum of wind velocities. While the windwheel 6 is shown schematically as a squirrel cage, it will be appreciated by those skilled in the art that it may take a wide variety of turban and blade forms. The rotation energy of windwheel 6 is transmitted to the fluid clutch and drive box 7 which may either receive energy from windwheel 6 or an outside source by means of drive shaft 8. Such an outside source could be an auxiliary diesel engine or, for example, a D.C. motor energized by batteries where the wind power conversion system is used as an auxiliary or supplementary device. In any case, the purpose of the external power input shaft 8 is to provide an alternate means of power input to the flywheel energy storage 9 which under usual conditions is driven by the windwheel 6 and capable of storing enough energy to carry the system through ordinary periods of low winds.

Flywheel 9, which is preferably in a vacuum enclosure 9A, is connected either directly or through gearing to alternator 11 which provides the A.C. current to be used. The use of an alternator is made possible by the fact that the self-regulating vane system and the flywheel cooperate to maintain the speed of generator 11 sufficiently steady to obtain a regulated output. At times of excess capacity at alternator 11, the output or a portion of it can be rectified and used to charge a set of batteries, which in turn can, at periods of extraordinaryly lengthy periods of calm, supply the power to maintain the system operative.

The component parts of the system having been described and their functional relationship indicated, the overall functioning of the system can be described quickly: Wind currents entering the wind collecting structure 1 from any direction are directed by the movable vanes 2 towards the cylindrical windwheel 6. The movement of the vanes changes the exit area $0_2$ and therefore the ratio between the entrance area $0_1$ and the exit area $0_2$. Since $$V_{in} : V_{out} = O_2 : O_1$$

where $V_{in}$ is the velocity of the wind entering the wind collecting structure at area $O_1$ and $V_{out}$ is the velocity of the wind as it leaves area $O\ 2$ and impinges on the wind wheel. It is clear that relation holds true only as long as the flow through the wind collecting structure is laminar. This can be achieved by keeping the collecting and directing surfaces sufficiently smooth to avoid turbulences and eddies. Moreover the amplification of velocity is limited up to the point where significant compression of the air takes place.

It has already been shown that the movement of the vanes 2 and the adjustment of the ratio $O_2/O_1$ is based on the wind velocity as measured by sensor 5 and transmitted by servo 4. The windwheel 6 is kept in cylindrical form so that the full impact of the wind velocity $V_{out}$ can be utilized regardless of the size of $O_2$.

The function of the fluid clutch and drive box used as a coupling means between the windwheel 6 and the flywheel 9 has been discussed. It provides the possibility of decoupling the windwheel from the flywheel in the event that the flywheel contains more energy than the windwheel at times of insufficient wind at the highest available velocity amplification, or of supplying additional energy to the flywheel from outside sources such as external electrical power, an auxiliary diesel engine or a long term storage battery with D.C. motor. The battery would receive energy from the A.C. generator 11 whenever it requires charging and whenever surplus capacity is available. For the selective coupling device 7 to work automatically, it only needs to be able to compare the relative speeds of the windwheel 6 and flywheel 9 and have a constant minimum speed for flywheel 9 at which point outside power is required to maintain the system in operation. The load receives all of its energy always from the same generator or generators and need not be switched over to meet the various conditions or power sources.

It should be understood that the system described above and schematically shown in FIG. 1 is an example illustrating the principle of the invention and subject to numerous variations. FIG. 2, for instance, shows an alternate method of constructing the wind collecting structure and associated windwheel. The wind collecting structure 15 which is shown in schematic cross-section as two 180° halves but could represent 90° or smaller sections, receives winds from all directions and channels them through a 90° turn to the windwheel 12 which can be a conventional propeller, with a diameter approximately equal to the diameter of $O_2$. The ratio $O_2:O_1$ is varied by varying $O_1$ at the entrance of the wind collecting structure, which is accomplished by movement of the aileron 13 extending over the entire 180° or 90° section.

The movement of the control surface 12 can be accomplished either by the wind velocity and servo combination described in connection with the previous example or it can be achieved by utilizing the coefficient of lift of the incoming wind velocity $V_{in}$, which increases with the square of the wind velocity. Control surface 12 may be made up of pairs of vanes coupled for common movement, thereby permitting variation of parameter of $O_1$ as well. Since the foregoing mechanical expedients are well known to those skilled in the art, we have limited the description of the invention primarily to the mechanical features thereof.

Some numerical example will indicate the approximate dimensions of $O_1, O_2$ and the power output that can be expected at given localities under given wind conditions.

EXAMPLE 1

At a locality where the average wind velocity is 14.6 mph (New York City or Oklahoma City) the prevailing wind, blowing 5 days out of 7 is 12.6 mph, equivalent to 18.4 feet per second. A wind convertor system with a propeller having a diameter of 1 foot will deliver 2.34 KW under prevailing wind conditions if the entrance area $O_1 = 7.85$ ft² corresponding to an entrance diameter of 3.16 ft and the exit area $O_2 = 0.785$ ft² corresponding to a diameter of 1 ft. (cf. Equation (5). Such a system would be expected to deliver over 1700 KW hours per month, nearly 2.4 times the average home requirement in the U.S. The above calculations is based on a generator having 70 percent conversion efficiency.

EXAMPLE 2

At the same type of locality as in Example 1, a wind convertor system with a propeller having a diameter of 15 feet will deliver 480.761 KW under prevailing wind conditions if the entrance area $O_1=12.370$ ft$^2$ corresponding to an entrance diameter of 125 feet and the exit area is $O_2=177$ ft$^2$ corresponding to an exit diameter of 15 feet.

EXAMPLE 3

At the same type of locality as in the previous examples, a wind convertor with a propeller of 20 feet diameter will deliver, 1,240,000 KW when $O_1=34558$ ft$^2$ (210 feet diameter) and $O_2=314.15$ ft$^2$ (20 feet diameter).

It is to be understood that the above described arrangements are merely illustrative of the varied arrangements which embody the principles of the invention. Such other arrangements may readily be devised by those skilled in the art without departing from the scope of the invention.

What is claimed is:
1. A wind to electric system comprising:
   a. a wind collecting structure having an entrance and exit opening;
   b. means for varying the areas of said entrance and exit openings relative to one another;
   c. means for sensing the velocity of an incoming wind;
   d. means coupled to said sensing means for adjusting the ratio between the areas of the entrance and exit openings in accordance with the sensed velocity;
   e. a wind-driven blade set disposed at the exit opening to receive the wind therefrom;
   f. flywheel coupled to the wind-driven blade set;
   g. clutch for decoupling said flywheel and blade set;
   h. an A.C. generator coupled to said flywheel.
2. The system claimed in claim 1 further comprising means for sensing the relative velocity of the blade set and flywheel, a means coupled to said clutch means for connecting said blade set and flywheel when the former is faster.

* * * * *